(12) United States Patent
Yin

(10) Patent No.: US 6,784,870 B2
(45) Date of Patent: Aug. 31, 2004

(54) PORTABLE COMPUTER SYSTEM INCLUDING DETACHABLE PERIPHERAL DEVICE AND COMBINED MOUSE/JOYSTICK FOR USE WITH SAME

(75) Inventor: Memphis Zhihong Yin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 335 days.

(21) Appl. No.: 09/855,229

(22) Filed: May 14, 2001

(65) Prior Publication Data

US 2002/0167482 A1 Nov. 14, 2002

(51) Int. Cl.[7] ............................................ G09G 5/00
(52) U.S. Cl. ...................................... 345/156; 345/164
(58) Field of Search ................................ 345/156, 161, 345/163, 164, 166, 167; 463/37, 38, 39; 361/681

(56) References Cited

U.S. PATENT DOCUMENTS

| | | | |
|---|---|---|---|
| 5,371,516 A | * | 12/1994 | Toyoda et al. .............. 345/179 |
| 5,517,211 A | | 5/1996 | Kwang-Chien |
| 5,764,224 A | | 6/1998 | Lilja et al. |
| 5,854,621 A | | 12/1998 | Junod et al. |
| 6,094,341 A | * | 7/2000 | Lin ............................. 361/681 |
| 6,111,563 A | | 8/2000 | Hines |
| 6,163,326 A | * | 12/2000 | Klein et al. ................. 345/156 |
| 6,184,869 B1 | * | 2/2001 | Harding et al. ............. 345/163 |
| 6,195,712 B1 | | 2/2001 | Pawlowski et al. |
| 6,392,634 B1 | * | 5/2002 | Bowers et al. .............. 345/163 |
| 6,480,184 B1 | * | 11/2002 | Price ........................... 345/163 |
| 6,532,002 B2 | * | 3/2003 | Segalle ....................... 345/163 |

FOREIGN PATENT DOCUMENTS

GB      2139762      * 11/1984

* cited by examiner

Primary Examiner—Chanh Nguyen

(57) ABSTRACT

A portable computer system in accordance with one embodiment of a present invention includes a portable computer and a peripheral device adapted to be mechanically connected to one another.

12 Claims, 5 Drawing Sheets

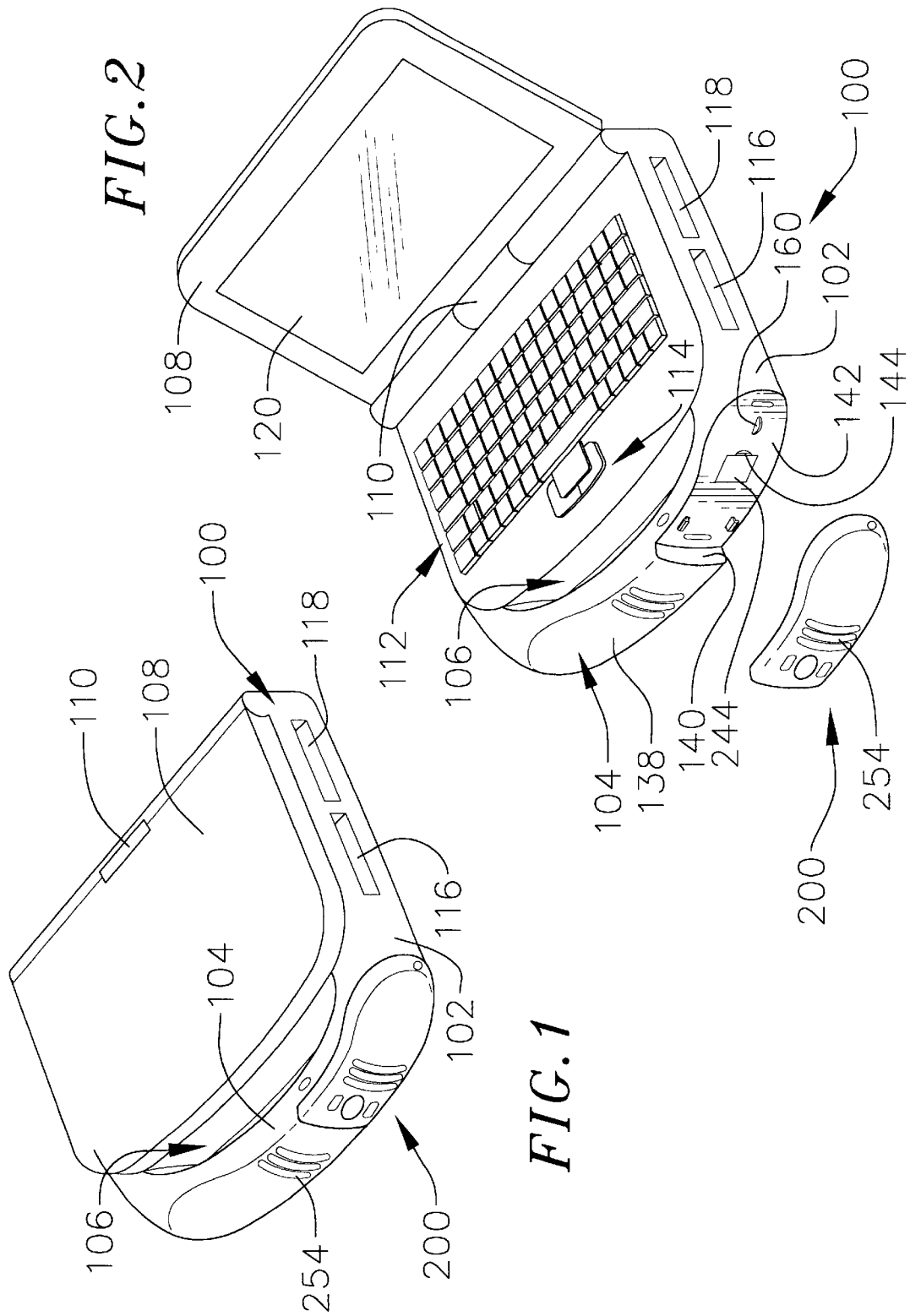

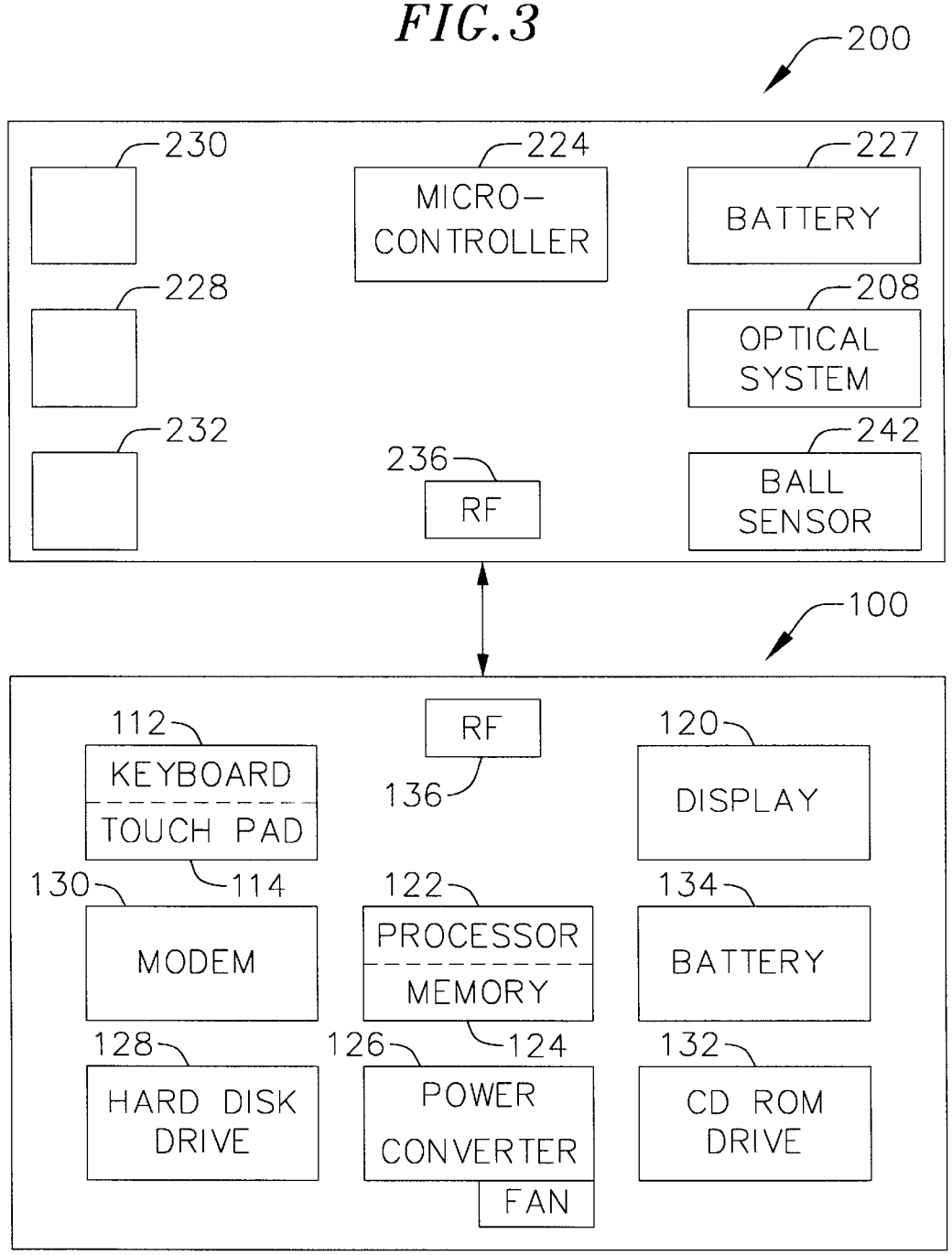

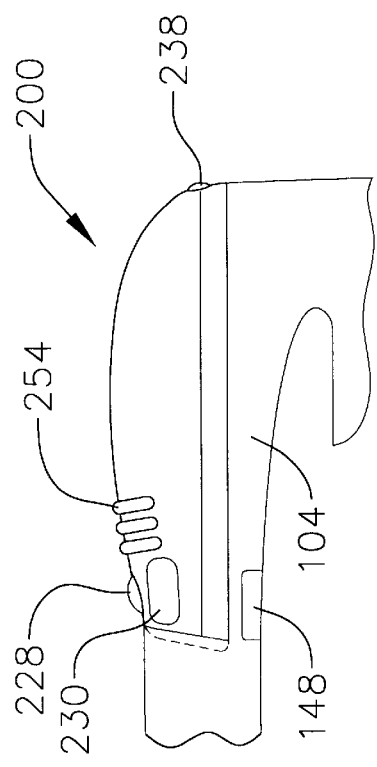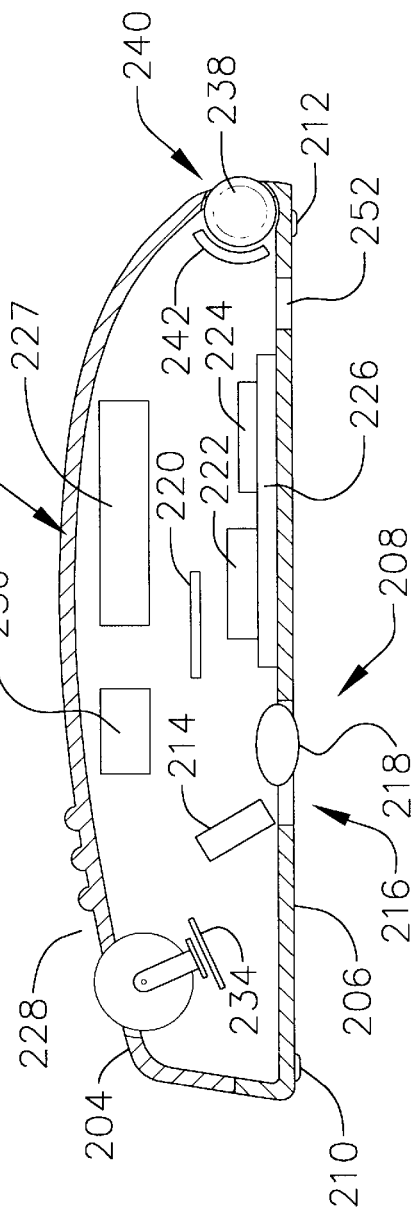

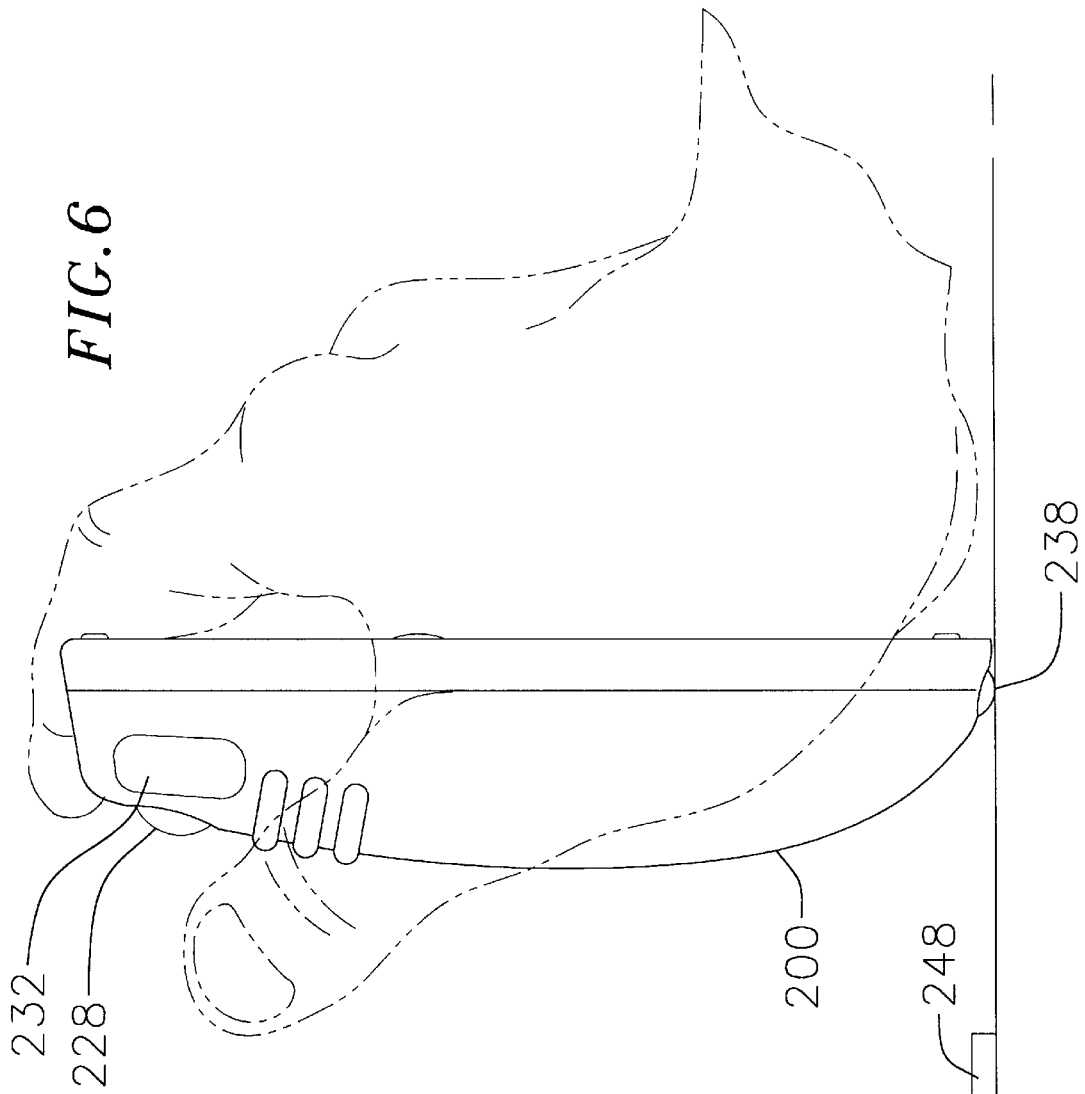

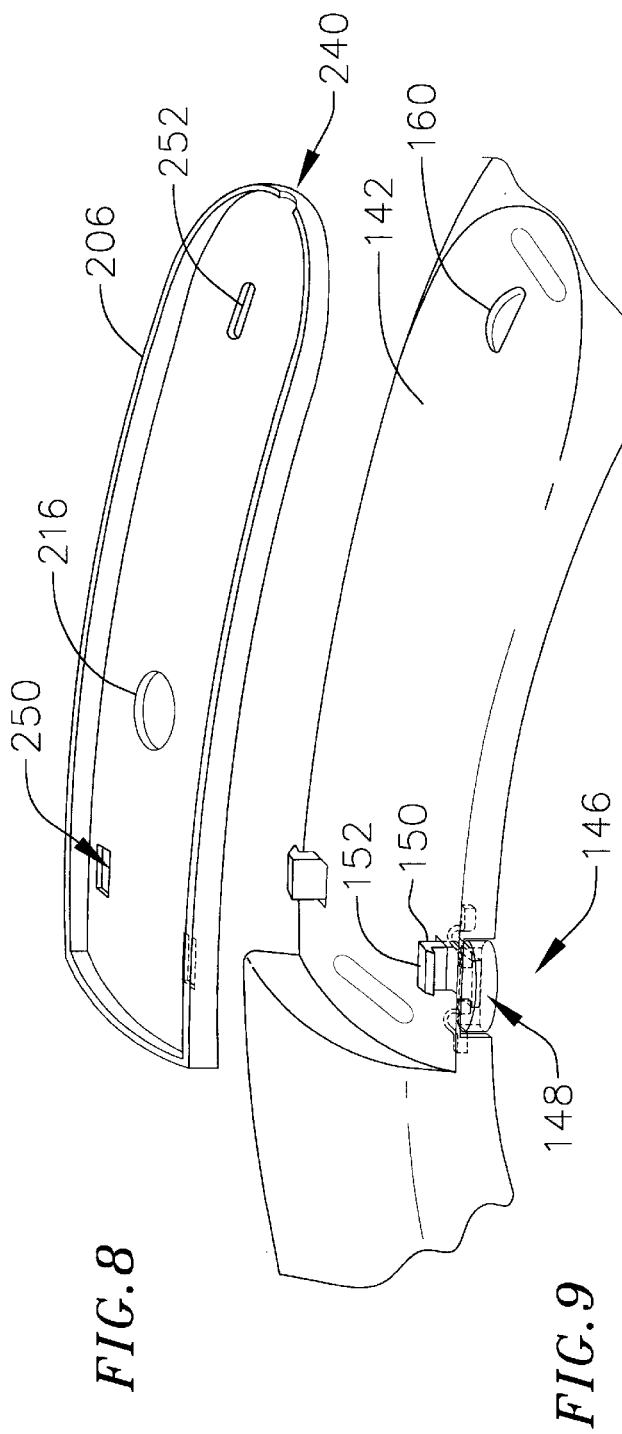
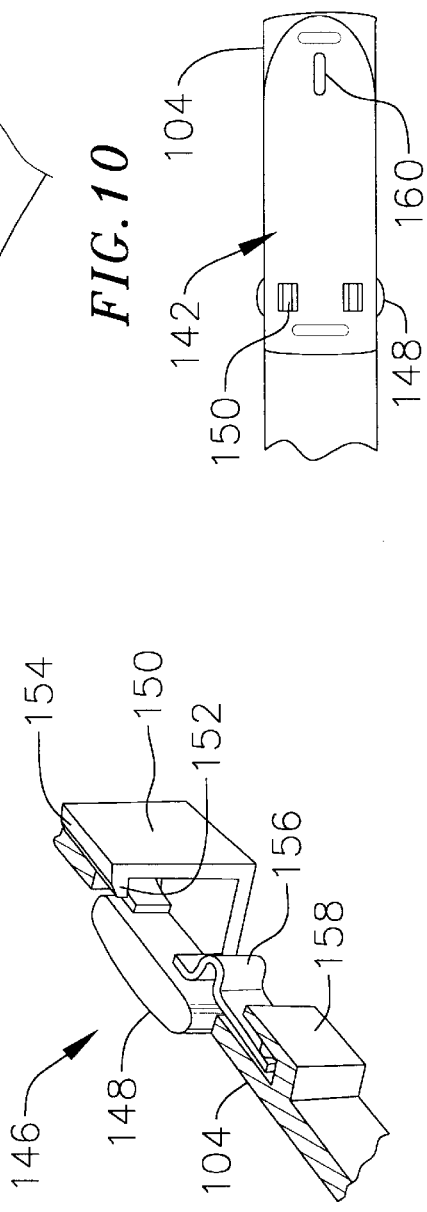
FIG. 8
FIG. 9
FIG. 10

PORTABLE COMPUTER SYSTEM INCLUDING DETACHABLE PERIPHERAL DEVICE AND COMBINED MOUSE/JOYSTICK FOR USE WITH SAME

BACKGROUND OF THE INVENTIONS

1. Field of the Inventions

The present inventions are related to portable computers and peripheral devices for use with portable computers.

2. Description of the Related Art

Personal computers, which allow people to easily perform tasks such as word processing, spreadsheet calculations, database manipulation, drafting, e-mail message transmission, and internet searches for information, have become ubiquitous in recent years. They have also become entertainment devices in that they may be used to play video games and enjoy audio/video material. Although personal computers were initially desktop devices, the fact that they have become such an integral portion of the average person's life has led to the development of portable computers such as laptop computers and, more recently, notebook computers. Portable computers have proven to be a significant advance because they are relatively small (i.e. about 13 inches wide, 10.5 inches long and 1.5 inches high) and lightweight (i.e. about 5 lbs.). As a result, people are able to easily transport portable computers to remote locations where they can perform the same tasks and enjoy the same entertainment that they could with their relatively immobile desktop computers.

Personal computers, both desktop and portable, are often used in conjunction with one or more peripheral devices such as a mouse, joystick and/or any other device that is moved or otherwise manipulated in order to control some aspect of the operation of the computer. Such peripheral devices must be transported with portable computers. The inventor herein has determined that conventional methods of transporting peripheral devices, such as carrying them separately or loading them into a carrying case with the portable computer, are inconvenient. The inventor herein has also determined that conventional peripheral devices are themselves susceptible to improvement.

SUMMARY OF THE INVENTIONS

A portable computer system in accordance with one embodiment of a present invention includes a portable computer including a keyboard, a display, and a computer mechanical connector and a peripheral device including a movement sensor and a peripheral device mechanical connector configured to mate with the computer mechanical connector. Such a system avoids, for practical purposes, the aforementioned problems in the art. Most notably, because the portable computer and peripheral device may be carried as a single unit when connected to one another, the present invention allows users to conveniently transport both without having to carry them separately or load them into a separate carrying case.

A peripheral device in accordance with one embodiment of a present invention includes a housing, a first movement sensor adapted to sense movement of the housing relative to a surface on which the device is used, a movable member movable relative to the housing, and a second movement sensor adapted to sense relative movement between the housing and the movable member. In one implementation of the invention, the first sensor will be operable when the peripheral device is in one orientation relative to the surface and the second sensor will be operable when the device is in another orientation relative to the surface. Such a peripheral device is superior to conventional peripheral devices because it can take the place of two typically separate peripheral devices, such as a mouse and a joystick, thereby reducing the number of peripheral devices that, for example, a person must transport with a portable computer.

The above described and many other features and attendant advantages of the present inventions will become apparent as the inventions become better understood by reference to the following detailed description when considered in conjunction with the accompanying drawings.

BRIEF DESCRIPTION OF THE DRAWINGS

Detailed description of preferred embodiments of the inventions will be made with reference to the accompanying drawings. Certain aspects of the preferred embodiments have been eliminated from some of the views for clarity.

FIG. 1 is a perspective view of a portable computer system in accordance with a preferred embodiment of a present invention.

FIG. 2 is a perspective view of the portable computer system illustrated in FIG. 1 with the portable computer cover in the open position and a peripheral device separated therefrom.

FIG. 3 is a block diagram showing various operating components of a portable computer and a peripheral device in accordance with a preferred embodiment of a present invention.

FIG. 4 is a partial side view of a portable computer handle and a peripheral device in accordance with a preferred embodiment of a present invention.

FIG. 5 is a side, partial section view of a peripheral device in accordance with a preferred embodiment of a present invention.

FIG. 6 is a side view showing the peripheral device illustrated in FIG. 5 in use.

FIG. 7 is a plan view of a mounting device in accordance with a preferred embodiment of a present invention.

FIG. 8 is a perspective view of various portions of the portable computer system illustrated in FIGS. 1 and 2.

FIG. 9 is a perspective view of a latch mechanism in accordance with a preferred embodiment of a present invention.

FIG. 10 is a top view of a portable computer handle in accordance with a preferred embodiment of a present invention.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions. Additionally, it is noted that detailed discussions of various conventional internal operating components of portable computers and peripheral devices which are not pertinent to the present inventions have been omitted for the sake of simplicity.

As illustrated for example in FIGS. 1 and 2, a portable computer system in accordance with one embodiment of a present invention includes a portable computer and a peripheral device that may be removably mounted on the portable computer. Although not limited to any particular style of portable computer, the exemplary portable computer 100 is preferably a notebook style computer including a main housing 102 that is approximately 13 inches wide, 10.5 inches long and 1.5 inches high. The main housing 102 is provided with a handle 104 that defines an open region 106 in which the user's fingers will rest when carrying the computer. Although not limited to any particular peripheral device, the device may be a mouse or a joystick. In the illustrated embodiment, the peripheral device is a combined mouse/joystick device 200. The mouse/joystick device 200 is removably mounted on the housing handle 104 in the illustrated embodiment. The mouse/joystick device 200 and handle 104 are also respectively sized and shaped such that the mouse/joystick device, when attached, will form part of the overall contour of the portable computer 100 and be relatively unnoticeable. The exemplary portable computer 100 and mouse/joystick device 200, as well as the mechanical and signal connections therebetween, are discussed in greater detail below.

Turning first to the portable computer aspects of the present inventions, the exemplary portable computer 100 illustrated in FIGS. 1 and 2 is, with respect to many of the structural and operating components, substantially similar to conventional portable computers such as the Hewlett-Packard Omnibook 6000 notebook PC. More specifically, the exemplary portable computer 100 includes structural components such as a display housing 108 that is pivotably connected to the main housing 102 by a hinge 110. A keyboard 112 and a dual pointing device 114 (i.e. touch pad and pointer) are mounted on the exterior of the main housing 102. The main housing 102 also includes a module bay 116 for optional modules such as a 3.5 inch disk drive module, a CD-ROM drive module or a ZIP drive module, and a battery bay 118. In addition to supporting a display 120, the display housing 108 also acts as a lid to cover the keyboard 112 and dual pointing device 114 when in the closed position (FIG. 1). To that end, a conventional latch arrangement (not shown) may be provided to lock the free end of the display housing 108 to the main housing 102 and maintain the display housing in the closed position.

As illustrated in block diagram form in FIG. 3, the operating components of the exemplary portable computer 100 include a processor 122, cache and RAM memory 124, a power adapter and fan arrangement 126, a hard disk drive 128 and a modem 130. A CD-ROM drive module 132 is positioned within the module bay 116 and a battery 134 is positioned within the battery bay 118 in the exemplary component configuration. The exemplary portable computer 100 may also include other conventional operating components such as, for example, audio and video cards, headphone and microphone ports, a serial port, a parallel port, keyboard and mouse ports, a 240-pin PCI connector for docking, an operating system such as Microsoft® Windows, and various application programs such a word processing, spreadsheets and games.

Turning to the exemplary mouse/joystick device 200, and as illustrated for example in FIGS. 4–6, the mouse/joystick device includes a housing 202 which consists of an upper portion 204 that is removably connected to a lower portion 206. The housing 202 is also approximately 4.0 inches long, 1.5 inches wide and 1.0 inch high in the exemplary embodiment.

The mouse aspects of the mouse/joystick device 200 include a conventional system for sensing the movement of the device relative to the surface on which it is being used when in the "mouse orientation" (FIG. 5).Such systems include a conventional rotatable ball and sensor arrangement. The exemplary embodiment, however, includes a conventional optical system 208 that tracks the movement of the mouse/joystick device as the lower housing portion 206, which rests on small skids 210 and 212, moves over tabletop or other surface when operating in the "mouse mode." The exemplary optical system 208 includes a light source 214, such as a pair of differently angled LEDs, which directs light though an opening 216 in the lower housing portion 206. The light is reflected off of the tabletop or other surface and passes through a lens assembly 218, which consists of an x-axis lens and a y-axis lens. This light is then reflected off of a reflector assembly 220, which consists of an x-axis reflector and a y-axis reflector, onto an optical sensor 222. Signals from the optical sensor 222 are then processed by microcontroller 224 and converted into motion data that is indicative of the movement of the mouse/joystick device 200 over the surface on which it is moving. Suitable optical systems include the optical system found in the Microsoft® IntelliMouse® optical mouse.

The data provided by the optical system is used by software in the portable computer 100 to perform particular functions, such as repositioning a cursor on the display 120. The microcontroller 224 is mounted on a circuit board 226 which includes memory and other conventional devices. Power for the mouse/joystick device 200 is supplied by a battery 227.

In the illustrated embodiment, the mouse/joystick device 200 is provided with a depressible and rotatable wheel 228 and a pair of buttons 230 and 232. The wheel 228 and buttons 230, 232 engage a contact plate 234 when depressed. The contact plate 234, along with a rotational motion sensor that is associated with the wheel (e.g. a displacement encoder—not shown), are connected to the microcontroller 224 by way of the circuit board 226. Movement of the wheel and buttons also causes the software in the portable computer 100 to perform particular functions.

The exemplary mouse/joystick device 200 illustrated in FIGS. 4–6 is preferably a wireless device that communicates to the portable computer 100 without being physically connected with a communication cable. Such communication may take place through the use of, for example, high frequency, radio frequency (RF), or infrared communication signals. RF signals are used in the illustrated embodiment and, to that end, the mouse/joystick device 200 is provided with a RF transmission apparatus 236 that is suitable for use in a wireless peripheral device. Such RF transmission apparatus typically include a frequency synthesizer that is controlled by the microcontroller 224, a RF amplifier and an antenna. One example of a RF transmission apparatus that is suitable for use in a wireless peripheral device is disclosed in U.S. Pat. No. 5,854,621. The exemplary portable computer 100 is provided with a corresponding RF receiver 136 (FIG. 3).

Although wireless transmission is preferred, the mouse/joystick device 200 may instead be connected to the portable computer 100 with a communication cable (not shown). Here, the cable could be stored in a recess or on a spring biased spool that automatically rewinds the cable as the mouse/joystick device 200 is moved toward the portable computer 100. The spool and recess (both not shown) could be located within handle portion 138 and accessible through an opening in wall 140 (FIG. 2).

Turning to the joystick aspects of the exemplary mouse/joystick device 200 illustrated in FIGS. 4–6, a spherical ball 238 protrudes slightly through an opening 240 that is located at the rear of the housing 202 and is smaller than the diameter of the ball. The ball 238, which is free to spin relative to the housing 202, is held in place by a conventional ball restraint and sensor arrangement 242, such as those found in a conventional ball-type mouse. Rotational movement of the ball 238 relative to the sensor arrangement 242 is converted into digital signals which are transmitted to the portable computer 100 by the RF transmission apparatus 236.

Preferably, when the exemplary mouse/joystick device 200 is held in the "joystick orientation" illustrated in FIG. 6, the user will pivot the housing 202 about the ball 238 while the ball remains stationary on the tabletop or other surface. To that end, and as illustrated for example in FIGS. 6 and 7, a separate mounting device 244 for holding the ball 238 stationary may also be provided. The exemplary mounting device 244 includes three protuberances 246 mounted on a base 248. Of course, the user may elect not to use the mounting device 244 or even to simply push the entire housing 202 in one direction or the other, thereby causing the ball 238 to roll along the tabletop or other surface to achieve the desired amount and direction of ball rotation.

With respect to storage, the mounting device 244 may be snap fit into a similarly shaped opening formed in the handle portion 142 (FIG. 2). A small indentation 144 may also be provided in the handle portion 142 to facilitate removal of the mounting device 244. Alternatively, the mounting device 244 may be incorporated into the surface of the housing 102 near the dual pointing device 114. The mounting device 244 may also be incorporated into a cap that covers the ball 238 when the device is not in use.

The digital signals generated by movement of the ball 238 relative to the housing 202 are used by the portable computer 100 in the same manner that signals generated by pivoting a conventional joystick are used. Additionally, the rotatable/ depressible wheel 228 and buttons 230, 232 may also be used when the device is being used in "joystick mode."

The mouse/joystick device 200 may be switched between the "mouse mode," where signals corresponding to the movement sensed by the optical system 208 are transmitted to the portable computer 100, and "joystick mode," where signals corresponding to the movement sensed by the ball sensor arrangement 242 are sent to the personal computer, in a variety of ways. For example, a mouse-joystick button may be provided that allows the user to switch between modes. Alternatively, the microcontroller 224 may be used to automatically determine whether the mouse/joystick device 200 is being used as a mouse or a joystick. This determination may be made by analyzing the signals from the optical system 208 (e.g. is any light being reflected) and/or the ball sensor arrangement 242 (e.g. is the ball moving relative to the housing 202). [Note that the ball 238 will not engage the surface on which the mouse/joystick device 200 is resting when the device is in the "mouse orientation" shown in FIG. 5.] A rotary position sensor (not shown) may also be provided to determine the angular orientation (that shown in FIG. 5 or that shown in FIG. 6) of the mouse/joystick device 200.

As noted above, the exemplary portable computer 100 and mouse/joystick device 200 may be removably connected to one another and, in the illustrated embodiment, the portable computer housing 102 may be removably connected to the mouse/joystick device housing 202. As illustrated for example in FIGS. 8–10, the surface of the portable computer handle portion 142 is shaped and sized so as to correspond to the bottom surface of the mouse/joystick device 200. The mouse/joystick device 200 is secured to the handle portion 142 in the exemplary implementation with a pair of handle latch mechanisms 146 that mate with apertures 250 on the housing lower portion 206 of the mouse/ joystick device. Each latch mechanism 146 consists of a button 148 which is connected to a latch 150 having a hook 152 with a cam surface 154. The latch 150 is biased into the lock position by a pair of springs 156 that are held by slots 158. The handle 104 is also provided with an alignment pin 160 that mates with an alignment aperture 252 on the lower portion 206 of the mouse/joystick device housing 202.

When the mouse/joystick device 200 is placed against the handle 104, the cam surfaces 154 will cause each latch 150 to move against the biasing force of the springs 156 to their respective unlock positions, thereby aligning the hooks 152 with the corresponding housing apertures 250. The hooks 152 will then enter the housing apertures 250 and, once inside, each of the latches 150 will be urged by the springs 154 to their respective lock positions. The mouse/joystick device 200 may be released from the handle 104 by simply depressing the buttons 148 with enough force to overcome the biasing force of the springs 156 and align the hooks 152 with the apertures 250.

As illustrated for example in FIGS. 1, 2 and 4–6, the exemplary portable computer handle portion 138 and mouse/joystick device housing 202 may each be provided with a series of ridges 254 that help the user grip the computer handle 104 when carrying the portable computer 100. The ridges 254 also help the user grip the mouse/ joystick device 200 when it is separated from the portable computer 100.

Although the present inventions have been described in terms of the preferred embodiments above, numerous modifications and/or additions to the above-described preferred embodiments would be readily apparent to one skilled in the art.

By way of example, but not limitation, the mouse/joystick device and portable computer may be configured such that the mouse/joystick device can be mounted on a portion of the computer housing other than the handle. In such an embodiment, the portable computer may be provided without a handle if desired.

The mouse/joystick device may also be provided with a built-in rechargeable battery and the portable computer may be provided with a charging power supply and connectors that will mate with corresponding connectors on the mouse/ joystick device and recharge the rechargeable battery when the mouse/joystick device is mounted on the portable computer.

The mouse/joystick device is not limited to use with portable computers and may, for example, be used in conjunction with other host devices such as desktop computers and video game consoles.

The above-described latch arrangement may be rearranged such that the latch is associated with the mouse/ joystick device and the apertures are associated with the computer. Other types of connection devices may also be employed in place of, or in combination with, the latch arrangement.

It is intended that the scope of the present inventions extend to all such modifications and/or additions.

I claim:

1. A system, comprising:
   a portable computer including a keyboard, a display, a housing with a main portion and a handle portion positioned relative to one another such that an open region is defined therebetween, and a computer mechanical connector associated with the handle portion; and a peripheral device including a housing, a movement sensor, and a peripheral device mechanical connector configured to mate with the computer mechanical connector;

wherein the respective positions of the computer mechanical connector and the peripheral device mechanical connector and the respective configurations of the handle portion and peripheral device are such that the open region will not be completely obstructed when the peripheral device mechanical connector mates with the computer mechanical connector.

2. A system as claimed in claim 1, wherein the peripheral device includes a wireless transmitter and the portable computer includes a wireless receiver.

3. A system as claimed in claim 1, wherein the portable computer housing includes a first housing portion and a second housing portion pivotable relative to the first housing portion between an open position and a closed position.

4. A system as claimed in claim 3, wherein the keyboard is mounted on the first housing portion and the display is mounted on the second housing portion.

5. A system as claimed in claim 1, wherein the computer housing handle portion defines a portion of an overall device handle and the peripheral device defines a remainder of the overall device handle.

6. A system as claimed in claim 1, wherein the peripheral device comprises a mouse.

7. A system as claimed in claim 1, wherein the peripheral device comprises a combined mouse/joystick device.

8. A system as claimed in claim 1, wherein computer mechanical connector comprises a latch and the peripheral device mechanical connector comprises a latch aperture.

9. A system as claimed in claim 1, wherein the computer housing is connected to the peripheral device housing when the computer mechanical connector mates with the peripheral device mechanical connector.

10. A system, comprising:

a portable computer including a main housing defining an open region and having a handle located adjacent to the open region, a display housing pivotable relative to the main housing between an open position and a closed position, a keyboard associated with the main housing, a display associated with the display housing, a computer latch device mounted on the handle and a wireless receiver; and a mouse/joystick device including a housing defining a latch aperture adapted to receive the computer latch, a first movement sensor associated with the housing and adapted to sense movement of the housing relative to the surface, a movable member associated with the housing and movable relative to the housing, a second movement sensor associated with the housing and the movable member and adapted to sense movement of one of the housing and the movable member relative to the other of the housing and the movable member;

wherein the computer handle defines a portion of an overall device handle and the mouse/joystick device housing defines a remainder of the overall device handle and the overall device handle does not obstruct the open region.

11. A system as claimed in claim 10, wherein movement sensed by the first and second movement sensors is converted into movement data that is indicative of movement, the system further comprising:

a wireless transmitter associated with the mouse/joystick device; and a wireless receiver associated with the portable computer.

12. A system, comprising:

a portable computer including a keyboard, a touch pad adjacent to the keyboard, a display, a housing having a handle portion with a first plurality of ridges configured to augment a user's grip on the handle and an open region defined between the handle portion and another portion of the housing, and a computer mechanical connector; and a peripheral device including a housing with a second plurality of ridges configured to augment a user's grip on the handle, a movement sensor, and a peripheral device mechanical connector facing away from the open region and configured to mate with the computer mechanical connector;

wherein the computer housing handle portion defines a portion of an overall device handle and the peripheral device housing defines a remainder of the overall device handle.

* * * * *